US006347328B1

(12) United States Patent
Harper et al.

(10) Patent No.: US 6,347,328 B1
(45) Date of Patent: Feb. 12, 2002

(54) OPTIMIZING THE OPERATION OF AN EQUIPMENT CONTROL SYSTEM USING ONE OR MORE SERVERS

(75) Inventors: Jeffrey G. Harper, Troy, MI (US); Brian F. Zustovich, Troutdale, OR (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/337,098

(22) Filed: Jun. 21, 1999

Related U.S. Application Data

(62) Division of application No. 08/837,955, filed on Apr. 14, 1997.

(51) Int. Cl.⁷ .................................................. G06F 9/00
(52) U.S. Cl. ........................... 709/105; 710/15; 710/18
(58) Field of Search ................................. 709/100, 102, 709/103, 104, 105, 106, 107, 108; 710/15 18, 200

(56) References Cited

U.S. PATENT DOCUMENTS

| | | | |
|---|---|---|---|
| 4,403,286 A | * | 9/1983 | Fry et al. ..................... 364/200 |
| 4,947,315 A | | 8/1990 | Sokolow et al. ............. 364/200 |
| 5,280,585 A | | 1/1994 | Kochis et al. ............... 395/275 |
| 5,764,958 A | | 6/1998 | Coskum ...................... 395/500 |
| 5,784,622 A | * | 7/1998 | Ralwitz et al. ............. 395/726 |

OTHER PUBLICATIONS

"Distributed Message Passing System", *FASTech Integration*, INForm MBX Commands, Nov. 1996, pp. 2–12 to 2–17.

"Introduction to CELLworks–Students's Manual–Sections 1–4", *FASTech Integration*, dated Jul. 1994, pp. 1.1.5, 1.1.10, and 1.1.13.

"Introduction—CELLworks–4 Architectural Overview", *FASTech Integration*, dated Aug. 1993, pp. 1–1 to 1–4 and 3–1 to 3–2.

* cited by examiner

*Primary Examiner*—Majid A. Banankhah
(74) *Attorney, Agent, or Firm*—Baker Botts LLP

(57) ABSTRACT

A method is provided for optimizing the operation of an equipment control system having an operating unit. In the method, an operating entity operable to perform a specific function is automatically added to the operating unit when such function is required of the operating unit. When the specific function of the operating entity is no longer required, the operating entity is automatically deleted from the operating unit.

16 Claims, 8 Drawing Sheets

FIG. 1

OPTIMIZING THE OPERATION OF AN EQUIPMENT CONTROL SYSTEM USING ONE OR MORE SERVERS

This application is a divisional of Ser. No. 08/837,955, filed Apr. 14, 1997.

TECHNICAL FIELD OF THE INVENTION

This invention relates in general to the field of computer software systems, and more particularly, to optimizing the operation of an equipment control system.

BACKGROUND OF THE INVENTION

Automated systems have been developed to control various devices or pieces of equipment in a service or production environment, such as an information services center or a manufacturing facility. In one such equipment control system, a variety of software programs or applications are provided for controlling a number of connected devices. Each program or application may support specific control functions which differ from functions supported by other programs and applications. When executed, the programs and applications cooperate to receive, forward, generate, and/or process information to instruct, command, order, manage, or otherwise control the devices. In order to execute these software programs or applications, code associated with the programs and applications must be stored into a hardware memory of the equipment control system.

Typically, the demands placed on such an equipment control system vary over time as the devices being controlled communicate with the system to receive information from and transmit information to the system. For any given moment, it is desirable to execute a sufficient number of programs or applications to support the effective control of the various devices. Previously, this was accomplished by determining the maximum functionality that would be required of the equipment control system during its operation, and storing into memory all of the code necessary to support this maximum functionality. When all code was simultaneously stored into memory, however, such an equipment control system operated inefficiently because less memory was available for other needs of the system.

SUMMARY OF THE INVENTION

In accordance with one embodiment of the present invention, a method is provided for optimizing the operation of an equipment control system having an operating unit. In the method, an operating entity operable to perform a specific function is automatically added to the operating unit when such function is required of the operating unit. When the specific function of the operating entity is no longer required, the operating entity is automatically deleted from the operating unit.

In accordance with another embodiment of the present invention, an equipment control system includes a memory operable to store software code associated with an operating entity. Such operating entity can perform a specific function. An operating unit is coupled to the memory. The operating unit comprises a primary server which can add the operating entity to the operating unit when the specific function is required of the operating unit. The primary server can delete the operating entity from the operating unit when the specific function of the operating entity is no longer required.

Important technical advantages of the present invention include an equipment control system which "grows" or "shrinks" in response to the current needs of the one or more devices being controlled. This is accomplished by separating the control functionality required of the equipment control system among various operating entities. These operating entities may comprise one or a combination of software applications, programs, routines, processes, or the like, which can be executed to implement operational control of the devices. Each operating entity may be either a server or a macro; one or more macros may reside within a server. Software code supporting the operating entities may be stored into a memory of the equipment control system. When the control functionality required of the equipment control system increases, operating entities are added to the system, and the supporting software code is added to the memory. When the control functionality required of the equipment control system decreases, operating entities are deleted, and the supporting software code is removed from the memory. Because the memory is not required to continuously maintain or store sufficient software code to support the maximum functionality that could be required of the equipment control system, the operation of the system is optimized.

Another technical advantage of the present invention includes providing an equipment control system having one or more primary servers, each primary server comprising one or more protected macros. Collectively, the primary servers within the equipment control system can provide all control functionality that may be required of the system. Likewise, collectively, the protected macros for each primary server are operable to perform all functions which may be required of that primary server. Primary servers can not be shut down, and protected macros cannot be deleted from the primary servers. Accordingly, at a minimum, the equipment control system will be able to support any functionality that is required of it.

Other important technical advantages are readily apparent from one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

Figure 1:
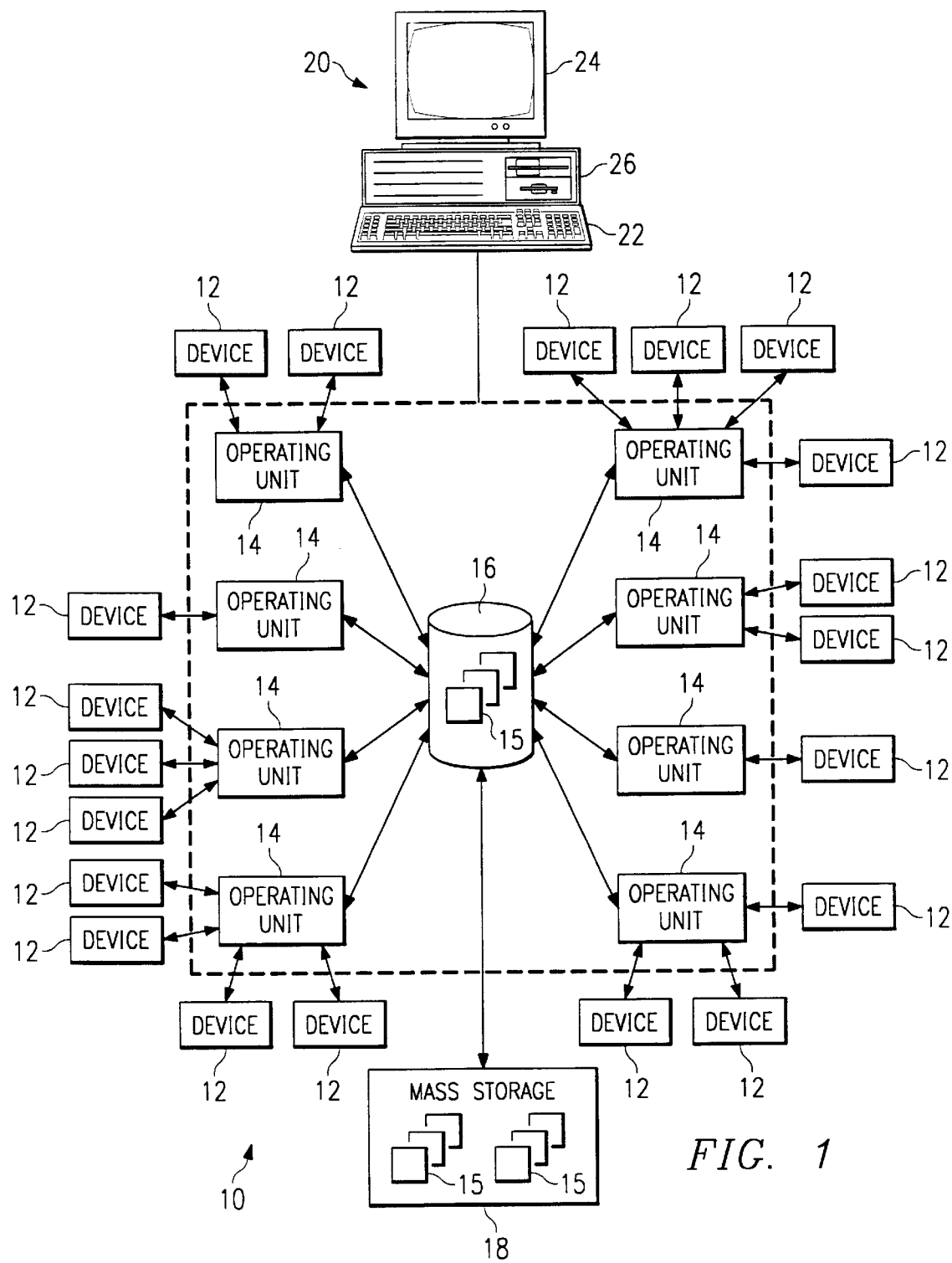
FIG. 1 illustrates a block diagram of an equipment control system in which the present invention may be incorporated.

The preferred embodiment of the present invention and its advantages are best understood by referring to FIGS. 1–9 of the drawings, like numerals used for like and corresponding parts of the various drawings.

Turning first to the nomenclature of the specification, the detailed description which follows is represented largely in terms of processes and symbolic representations of operations performed by conventional computer components, such as a central processing unit ("CPU") or processor associated with a general purpose computer system, memory storage devices for the processor, and connected pixel-oriented display devices. These operations include the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of this discussion, a process, method, routine, or sub-routine is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, or the like, which are often associated with manual operations performed by a human operator. It must be understood that no involvement of the human operator may be necessary, or even desirable, in the present invention. The operations described herein are machine operations performed in conjunction with a human operator or user that interacts with the computer or computers.

In addition, it should be understood that the programs, processes, methods, and the like, described herein are but an example of one implementation of the present invention and are not related or limited to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hardwired logic programs stored in non-volatile memory, such as read-only memory (ROM).

Referring now to the drawings, FIG. 1 illustrates a block diagram of an equipment control system 10 in which the present invention may be incorporated. Generally, equipment control system 10 communicates with (i.e., receives data from and outputs data to), supports, manages, directs, instructs, orders, or otherwise controls one or more devices 12. Each device 12 can be a particular physical or logical component which is connected to and controlled by equipment control system 10. Physical devices are associated with equipment, such as, for example, robots (not explicitly shown). These devices may be hardware devices, which perform control functions, or they may be communications devices, which communicate to intelligent self-controlled equipment. Logical devices are associated with software capabilities, such as a screen management system. Each device 12 comprises an interface (not explicitly shown) which allows it to communicate with equipment control system 10. In one embodiment, one or more devices 12 can be grouped into workcells dedicated to performing a specific task or group of related tasks. For example, and not by way of limitation, a workcell may comprise a database, a bar code reader, a robot, a programmable logic controller (PLC), and a user interface which cooperate to move pallets of unfinished product onto an assembly line.

As shown, equipment control system 10 includes a plurality of operating units 14, each of which is coupled to or in communication with one or more devices 12. The functionality of each operating unit 14 can be performed by any suitable processor, such as a main-frame, file server, workstation, or other suitable data processing facility running appropriate software. Operating units 14 can be dedicated to the control of a particular device or plurality of devices 12. That is, each operating unit 14 may operate independently to communicate with, support, direct, manage, order, instruct, or otherwise control the device(s) 12 to which it is coupled. In one embodiment, each operating unit 14 controls a corresponding workcell of related devices 12.

Operating units 14 may each include or utilize one or more operating entities, which can be servers and/or macros. Servers and macros operate in an integrated manner to provide seamless control of devices 12. Generally, servers and macros may each comprise one or a combination of software applications, programs, routines, processes, or the like, which are run or executed to implement the operational control of devices 12 by equipment control system 10. Servers and macros may receive certain information, such as, for example, status or request information, from devices 12. The servers and macros process this received information and, in response, may output other information, such as commands, instructions, directions, or other control information, which is then communicated to devices 12. Each server and macro is associated with and supported by suitable software code 15. Servers and macros are described below in more detail.

A memory 16 is coupled to or in communication with each operating unit 14. Memory 16 may reside in a suitable storage medium, such as RAM, ROM, disk, tape storage, or other suitable volatile and/or non-volatile data storage system. Memory 16 can be a relational database and, as shown, may be shared between all operating units 14 within equipment control system 10. Memory 16 functions primarily to receive, store, and forward the associated code 15 for each of the operating entities (i.e., servers and macros) utilized by operating units 14 to control devices 12. In particular, memory 16 stores software code 15 for these operating entities as they are being run or executed by operating units 14 to implement control functionality.

Mass storage device 18 is coupled to memory 16. Mass storage device 18 may be a mass storage subsystem of tapes, disk drives, or other suitable mass storage subsystem. Software code 15 (associated with servers and macros utilized by operating units 14) can be stored, received, and forwarded by mass storage device 18.

Equipment control system 10 may operate on one more computers, shown generally as computer 20. Computer 20 maintains and executes the instructions to perform the communication, support, management, and control operations of equipment control system 10. Computer 20 includes an input device 22, such as a keypad, touch screen, or other device that can accept information. An output device 24 conveys information associated with the operation of equipment control system 10, including digital data, visual information, or audio information. Both input device 22 and output device 24 may include fixed or removable storage media, such as magnetic computer disk, optical disk, CD-ROM, or other suitable media to both receive output from and provide input to equipment control system 10. One or more processors 26 and their associated memories execute instructions and manipulate information in accordance with the operation of equipment control system 10. In one embodiment, computer 20 may comprise a UNIX™ server system.

In operation, each operating unit 14 communicates with the device or devices 12 to which it is connected in order to control the same. In particular, operating units 14 receive information from devices 12. This received information may comprise information specifying the status of devices 12 and/or requests for directions or instructions. In response to the information received from devices 12, operating units 14 invoke or call various servers and/or macros, thereby causing the software code 15 associated with these operating entities to be copied from mass storage device 18 into memory 16. Operating units 14 then execute or run the servers and macros to process the received information, and generate instructions, directions, or other control information that is then communicated to devices 12.

Because memory 16 is shared by all operating units 14 to store associated software code 15 for the servers and macros during the operation of equipment control system 10, it is desirable that memory 16 be utilized in an efficient manner. As described below in more detail, the present invention optimizes the operation of equipment control system 10 by adding and deleting software code 15 for the various operating entities according to the current needs or demands placed upon equipment control system 10. That is, when operational demands for control are great, more servers and macros are invoked and the associated code 15 is added into memory 16. When operational demands are less, servers and macros are shutdown or terminated, and the associated code 15 deleted from memory 16.

Figure 2:
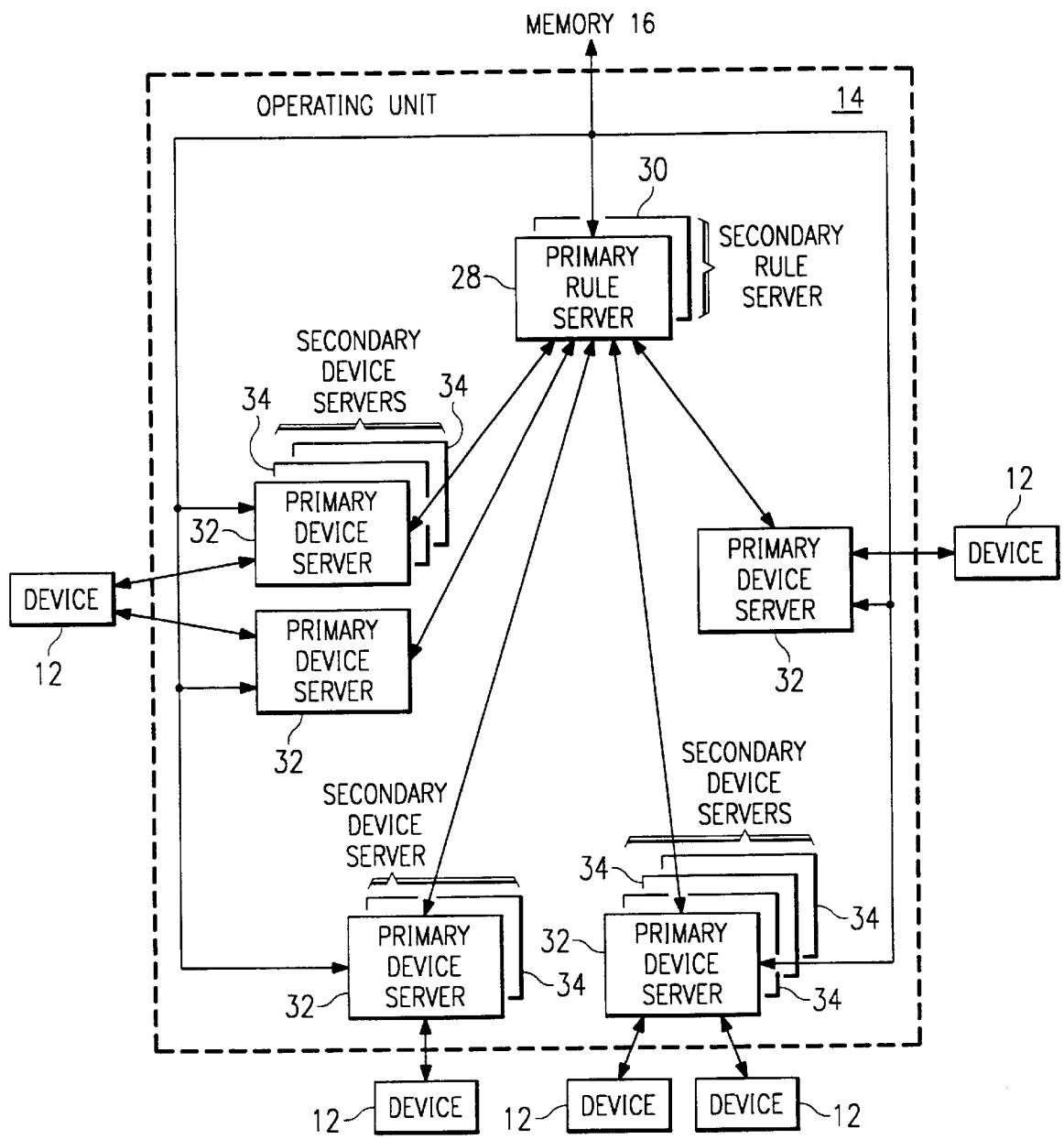
FIG. 2 illustrates a block diagram of an exemplary operating unit, according to an embodiment of the present invention.

FIG. 2 illustrates a block diagram of an exemplary operating unit 14, according to an embodiment of the present invention. Operating unit 14 includes a number of servers 28–34, each server comprising a software application, program, routine, process, or the like, which can be run or executed.

Each server 28–34 can be either a primary server or a secondary server. Primary servers are distinguished from secondary servers in that primary servers cannot be shutdown or terminated whereas secondary servers can be. Each primary server may perform one or more specific functions, which can differ from the functions performed by other primary servers. Each secondary server corresponds to a particular primary server, and may perform many of the same functions as its corresponding primary server. A secondary server is invoked or added to operating unit 14 only when the corresponding primary server is "full," as described herein. As shown, the primary servers in exemplary operating unit 14 include a primary rule server 28 and a plurality of primary device servers 32. The secondary servers of operating unit 14 include a secondary rule server 30 and a plurality of secondary device servers 34.

Generally, primary rule server 28, secondary rule server 30, primary device servers 32, and secondary device servers 34 cooperate to manage, direct, instruct, or otherwise control the device or devices 12 to which operating unit 14 is coupled. For this purpose, primary rule server 28, secondary rule server 30, primary device servers 32, and secondary device servers 34 may communicate with each other and the devices 12 which they control in the form of messages. These messages are passed between and among servers 28–34, and are preferably composed of ASCII text. Each server 28–34 may include a corresponding "mailbox" (not explicitly shown) into which the messages are delivered. Each of primary rule server 28, secondary rule server 30, primary device servers 32, and secondary device servers 34 has the capability to use an appropriate mailbox to command or request services of another server 28–34. In one embodiment, servers 28–34 may comprise intelligent object-oriented programs that generate and/or receive command messages.

Primary rule server 28 comprises a set of rules for managing the operation of operating unit 14. Primary rule server 28 performs logical operations to control and coordinate primary device servers 32 and secondary device servers 34. Primary rule server 28 sends command messages to device servers 32 and 34 via the mailbox system, and may receive reply messages in response.

Secondary rule server 30 is invoked or initiated when primary rule server 28 is "full." Specifically, if primary rule server 28 has received a number of messages (in its corresponding mailbox) to which it must respond and is incapable of handling all of these messages, such as, for example, within a predetermined amount of time, primary rule server 28 invokes secondary rule server 30 to perform any "overflow" of functions or operations that are required. Although FIG. 2 shows a single secondary rule server 30 operating in exemplary operating unit 14, it should be understood that no secondary rule server 30 would exist if primary rule server 28 was operating at less than "full" capacity. It should also be understood that additional secondary rule servers 30 could be invoked and added to operating unit 14 if primary rule server 28 and all currently-existing secondary rule servers 30 are "full." The present invention contemplates that up to a certain number of secondary rule servers 30 can be added for primary rule server 28, after which additional secondary rule servers cannot be added. In one embodiment, up to four secondary rule servers 30 can be added for primary rule server 28.

Primary device servers 32 are coupled to primary rule server 28 and any existing secondary rule servers 30. Each primary device server 32 may be coupled to and support one or more specific physical or logical devices 12. Primary device servers 32 provide clearly understood functions to devices 12. That is, each primary device server 32 is operable to perform one or more functional operations upon, or in response to, information that is received from the device(s) 12 which that primary device server 32 supports. Preferably, each primary device server 32 use command-oriented messages to instruct its associated device or devices 12 to perform various tasks. Exemplary device servers can be physical device servers and logical device servers. A physical device server manages or controls physical devices, such as robotic arms or scanners. A logical device server manages or controls logical devices, such as databases or processors.

One or more corresponding secondary device servers 34 may be invoked for each primary device server 32 when that primary device server 32 is "full." In particular, a corresponding secondary device server 34 is preferably added to operating unit 14 when its primary device server 32 and all currently-existing corresponding secondary device servers 34 for that primary server 32 are "full." The present invention contemplates that up to a certain number of secondary device servers 34 can be added for each corresponding primary device server 32. In one embodiment, up to four secondary device servers 34 can be added for a particular primary device server 32. Each secondary device server 34 may provide much of the same functionality that is supported by its corresponding primary device server 32.

Each primary device server 32 and its corresponding secondary device servers 34 operate independently of the other primary device servers 32 and their corresponding secondary device servers 34 within operating unit 14. Primary and secondary device servers 32 and 34 communicate with primary rule server 28 and any existing secondary rule server 30 to transmit information and receive controls, commands, or directions. Messages sent from a device server 32, 34 to a rule server 28, 30 may contain replies which are sent after the device server 32, 34 processes a previously sent command. Alternatively, messages sent from a device server 32, 34 to a rule server 28, 30 can be unsolicited messages; the logic to handle this would be contained in a protected macro (as explained below).

Figure 3:
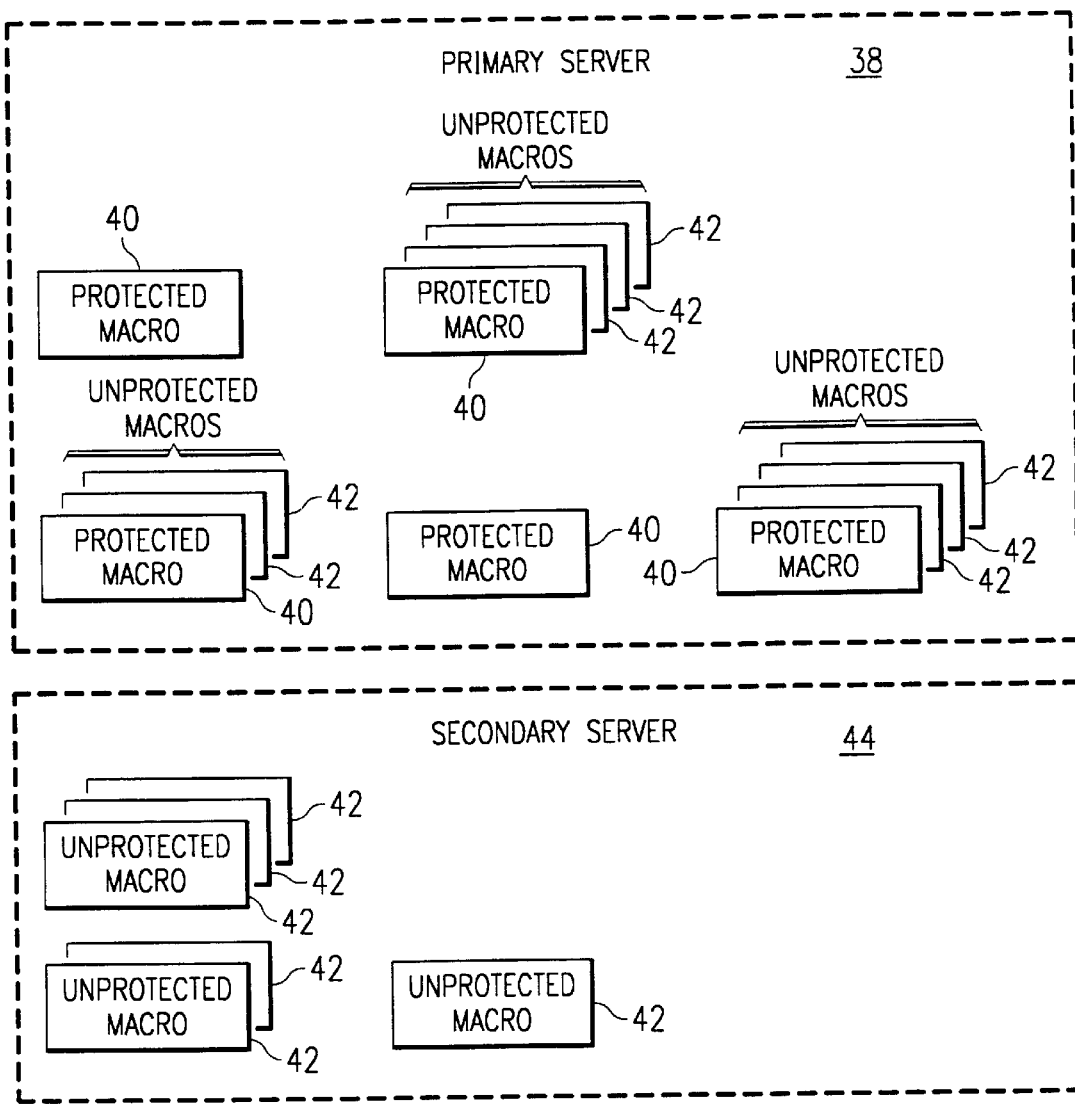
FIG. 3 illustrates a block diagram of an exemplary primary server and corresponding secondary server, according to an embodiment of the present invention.

Each of primary rule server 28, secondary rule server 30, primary device servers 32, and secondary device servers 34 is coupled to or communicates with memory 16, which stores the software code 15 for servers 28–34 and one or more macros (shown in FIG. 3). Macros define or establish the functionality of servers 28–34. Each macro can be used to perform one or more discrete tasks. Macros are logically segmented by function, and are called or invoked by servers 28–34 as needed during the operation of equipment control system 10. Each of primary rule server 28, secondary rule server 30, primary device servers 32, and secondary device servers 34 may utilize different macros to accomplish different purposes. In this manner, operating unit 14, and accordingly, equipment control system 10, achieves total control of devices 12 by implementing a distributed environment for performing various tasks.

In one embodiment, primary rule server 28 may initiate the running of various macros by primary and secondary device servers 32 and 34 in order to model the related functionality of devices 12 controlled by operating unit 14. That is, different "threads" of macros may model the different functions of devices 12. The macros within a thread are linked together so that as one macro finishes executing, the next macro it is linked to will begin executing.

Macros may be either protected macros or unprotected macros. Protected macros reside or exist only within primary servers, such as primary rule server 28 or primary device servers 32. A protected macro cannot be deleted or terminated from the primary server within which it resides. Unprotected macros may reside or exist within both primary servers, and also secondary servers, such as secondary rule server 30 and secondary device servers 34. An unprotected macro can be deleted or terminated from the server within which it resides when its operation is no longer required.

Generally, as equipment control system 10 begins to operate, exemplary operating unit 14 will contain only primary servers, such as primary rule server 28 and primary device servers 32. Each primary server will contain only one or more protected macros. As more processing is required of each primary server, unprotected macros are added to that primary server. When a primary server becomes full with protected and unprotected macros (thus indicating that it is processing at its highest capacity), it will invoke or call a corresponding secondary server, such as secondary rule server 30 and secondary device server 34. Unprotected macros are added to this secondary server to perform whatever functionality is desired or needed. When existing secondary servers become full, additional secondary servers are invoked or called, and macros added.

FIG. 3 illustrates a block diagram of an exemplary primary server 38 and corresponding secondary server 44, according to an embodiment of the present invention. Primary server 38 and corresponding secondary server 44 can reside in an operating unit 14.

Primary server 38 may comprise a number of protected macros 40 and unprotected macros 42. Each protected macro 40 may be executed to provide some functionality that is required of primary server 38 during operation of equipment control system 10. Collectively, the protected macros 40 contained within primary server 38 are operable to perform all functions which may be required of that primary server 38. Protected macros 40 cannot be deleted or removed from primary server 38 if they are not being utilized or executed. Each unprotected macro 42 within primary server 38 corresponds to a specific protected macro 40. Preferably, unprotected macros 42 provide the same functionality as the protected macros 40 to which the unprotected macros 42 correspond. Unprotected macros 42 are invoked or called by primary server 38 in order to support additional processing if necessary to assist protected macros 40. Each unprotected macro 42 can be deleted from primary server 38 when that unprotected macro 42 is no longer being utilized or executing.

Primary server 38 may have the capacity to support up to a predetermined number of each unprotected macro 42 corresponding to a particular protected macro 40. That is, for each protected macro 40, primary server 38 may have a specific number of "slots" for the addition of corresponding unprotected macros 42. For example, in one embodiment, up to four unprotected macros 42 can be added for a particular protected macro 40 in primary server 38.

Secondary server 44 is invoked when primary server 38 is busy or otherwise unavailable for processing. In contrast to primary server 38 which may comprise both protected macros 40 and unprotected macros 42, secondary server 44 comprises only unprotected macros 42. These unprotected macros 42 are loaded into secondary server 44 as needed to provide some particular functionality that would otherwise be required from primary server 38. In particular, each unprotected macro 42 within secondary server 44 may correspond to and support the same functions as a particular protected macro 40 contained in primary server 38. Like primary server 38, secondary server 44 may comprise a predetermined number of slots into which unprotected macros 42 may be added. Because all macros within secondary server 44 are unprotected macros, these macros 42 can be deleted if their functionality is no longer required.

Each protected macro 40 and unprotected macro 42 can be either a dynamic termination macro or a static termination macro. Dynamic termination macros terminate automatically. That is, a dynamic termination macro ceases to execute after each instance of performing the task or tasks for which it was designed. In contrast, a static termination macro must be specifically instructed to terminate; otherwise, it will continue to execute or run. Furthermore, until a terminate command is received, a static termination macro will continue to process any request that it receives. However, a static termination macro cannot be shutdown while it is actually processing.

In operation, primary server 38 monitors itself and any corresponding secondary servers 44. When enough messages are queued within the primary server's mailbox to reach a trigger level, the primary server 38 may issue a command to load an unprotected macro corresponding to a function which is in demand. The primary server 38 loads the called unprotected macro into the first server (either primary server 38 or a corresponding secondary server 44) with a slot available for that type of macro. If there are no available slots in any existing server, primary server 38 invokes or calls another secondary server 44, into which the necessary macro is loaded. Primary server 38 may also shut down secondary servers 44 and delete unprotected macros. However, primary server 38 cannot shut itself down, nor can it delete a protected macro. In all cases, scalability is controlled by the primary server. Handshaking is used between the primary server 38 and its corresponding secondary servers 44 to track the status of currently existing servers. Each of primary server 38 and secondary server 44 tracks the status of the protected macros 40 (if any) and unprotected macros 42 loaded in that server. Updates of a server's status are sent to primary server 38 as status changes. During shutdown, handshaking occurs between a server 38, 44 and its loaded macros 40, 42 to provide a shutdown without interrupting any current processing.

Figure 4:
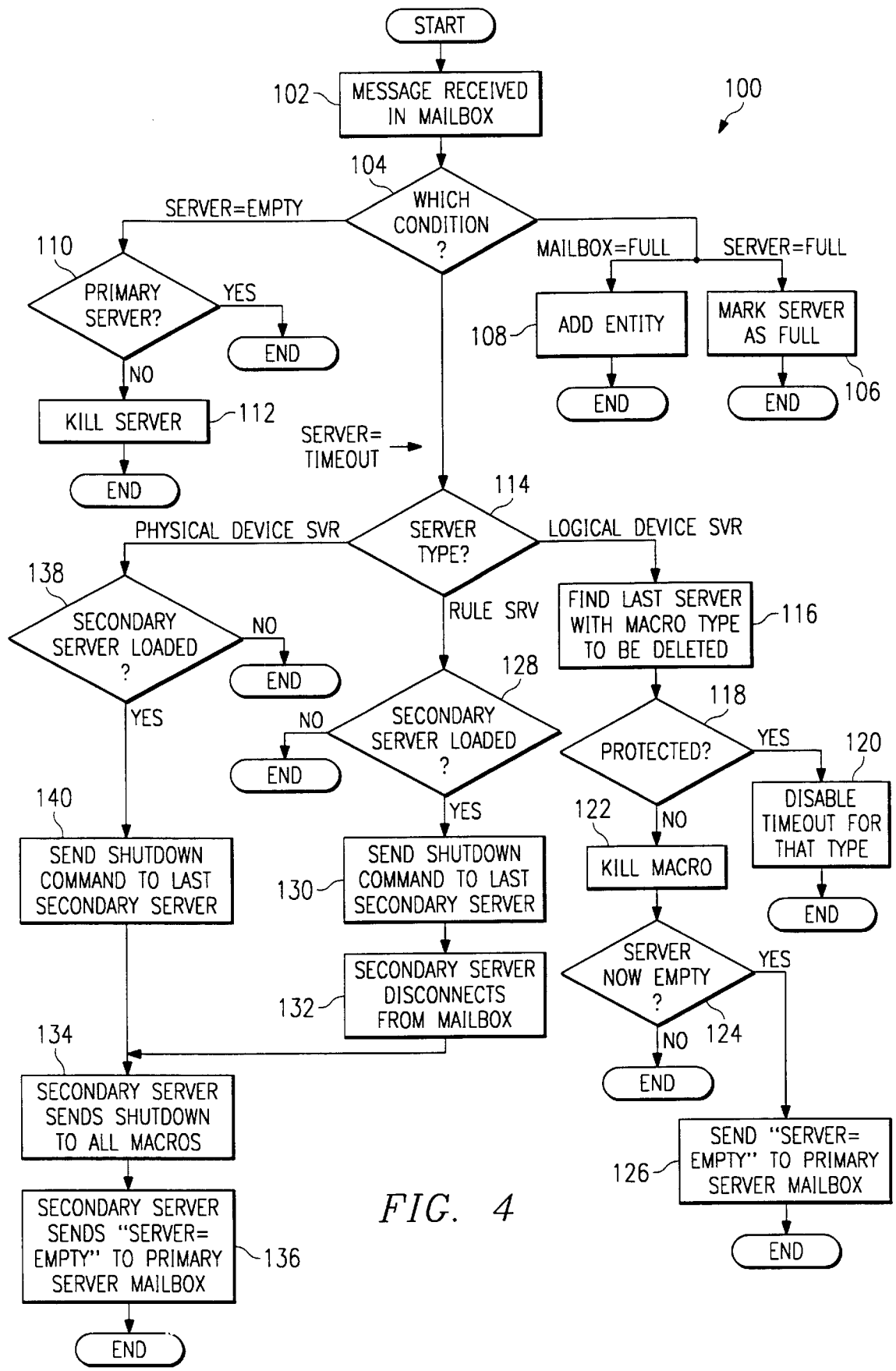
FIG. 4 is a flow chart of an exemplary method for optimizing the operation of an equipment control system, according to an embodiment of the present invention.

FIG. 4 is a flow chart of an exemplary method 100 for optimizing the operation of equipment control system 10, according to an embodiment of the present invention. Method 100 may correspond to the operation of a primary server, such as, for example, primary rule server 28 or a primary device server 32 shown in FIG. 2.

Method 100 begins at step 102 where a message is received in the mailbox for the primary server. Such message may comprise a request triggered by any one of the following conditions: (1) a server is full ("Server=FULL"), (2) a mailbox is full ("Mailbox=FULL"), (3) a server is empty ("Server=EMPTY"), and (4) a server is in timeout ("Server=TIMEOUT"). Each message that may be received by the primary server at step 102 can be generated by the primary server itself or a corresponding secondary server. At step 104, the primary server determines what kind of condition has triggered the request.

A condition of "server is full" indicates that within the server generating the associated message all slots for a particular macro have been filled and, accordingly, no additional macros of that type can be added to the server. Thus, if a "Server=FULL" message was received, then at step 106 the primary server marks such server as full, thereby updating the status of the server. Method 100 then ends.

A condition of "mailbox is full" indicates that the number of messages received at the mailbox of a server has reach a predetermined limit. This means that the primary server and its existing secondary servers are not processing messages with sufficient pace rapidity. Consequently, if a "Mailbox=FULL" message was received, then at step 108 the primary server invokes a sub-routine by which another operating entity is added to assist the existing servers. An exemplary flow chart for such an "add entity" sub-routine is illustrated and described below in more detail with reference to FIG. 5.

A condition of "server is empty" indicates that either the primary server or one of its corresponding secondary servers is not currently processing, performing, or otherwise executing. In other words, all macros within such server generating the message have ceased to run. Thus, if a "Server=EMPTY" message is received, it is determined at step 110 whether the message was generated by the primary server. If so, then method 100 ends. On the other hand, if it is determined that the request was not generated by the primary server, then at step 112 the primary server "kills" or shuts down the secondary server generating the message. This causes the software code 15 supporting such secondary server to be deleted from memory 16 (shown in FIG. 1). Method 100 then ends.

A "server is in timeout" condition indicates that processing has ceased on the server generating the message. As shown in FIG. 4, such message can be generated by a macro contained in any of a rule server, a logical device server, or a physical device server. Thus, if a "Server=TIMEOUT" message has been received, then at step 114 the primary server determines what type of server generated the message.

If the server generating the message is a logical device server, then at step 116 the primary server identifies such logical device server so that a macro can be deleted if desired. At step 118, the primary server determines whether the macro is protected. If the macro is protected, it should not be deleted, and, accordingly, the primary server disables the "timeout" for that type of macro at step 120. Method 100 then ends. Otherwise, if the macro is not protected, then the primary server "kills" or shuts down the macro at step 122, thereby causing the associated software code 15 to be deleted from memory 16.

At step 124, the primary server determines whether the logical device server within which the deleted macro was contained is now empty. If that logical device server is not empty, method 100 ends. Otherwise, if such server is now empty, a "Server=EMPTY" message is sent to the mailbox of the primary server at step 126. Method 100 then ends.

Referring again to step 114, if it is determined that the server type generating the "Server=TIMEOUT" message is a rule server, then the primary server determines whether any secondary server has been loaded at step 128. If a secondary server has not been loaded, then the "Server=TIMEOUT" message was generated by the primary server itself. Because the primary server cannot be shutdown, method 100 ends. Otherwise, if any secondary servers have been loaded, then at step 130 the primary server sends a shutdown command to the secondary server which was loaded last.

At step 132, this secondary server is disconnected from the mailbox of the primary server. This secondary server then sends a shutdown command to all macros contained within that server at step 134. The shutdown command causes the software code 15 supporting these macros to be deleted from memory 16. After all macros have been shutdown, then at step 136 the secondary server sends a "Server=EMPTY" message to the mailbox for the primary server. Method 100 then ends.

With further reference to step 114, if the primary server determines that the server type from which the "Server=TIMEOUT" message was received is a physical device server, then at step 138 the primary server determines whether any secondary servers have been loaded. If no secondary servers have been loaded, then the message was generated by the primary server itself. Because a primary server cannot be shutdown, method 100 ends.

Otherwise, if at least one secondary server has been loaded, then at step 140 the primary server sends a shutdown command to the secondary server which was loaded last. At step 134, this secondary server sends a shutdown to all of the macros contained within that server, thereby causing the macros to shutdown and deleting the associated software code 15 for such macros from memory 16. The secondary server sends a "Server=EMPTY" message to the mailbox of the primary server at step 136. Method 100 then ends.

Thus, according to the method described above, servers and macros are added to and deleted from an operating unit 14 as necessary to accomplish the functionality required of equipment control system 10 during its operation. This addition and deletion of servers and macros causes associated software code 15 to be copied into and removed from memory 16. The operation of equipment control system 10 is optimized because only the software code 15 that is needed to provide functionality at any given moment will be contained in memory 16 at such time.

From the illustration and description of FIG. 4, it should be understood that the same method for optimizing the operation of equipment control system 10 is performed by each primary server regardless of whether the primary server is a primary rule server, primary logical device server, or primary physical device server. Because separate methods are not provided for different types of primary servers, the maintenance and update associated with the optimization method are facilitated.

Figure 5:
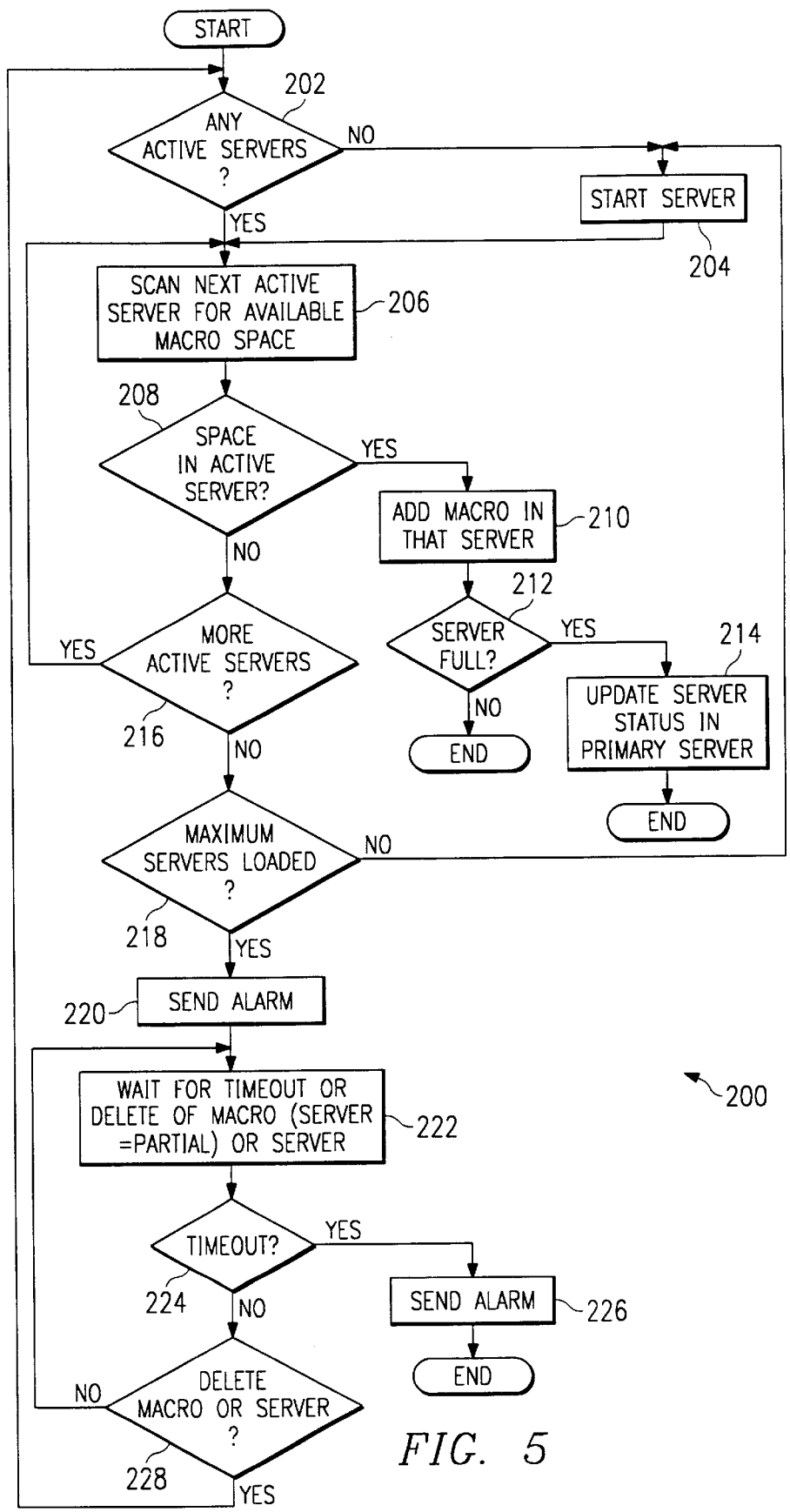
FIG. 5 is a flow chart of an exemplary method for adding an operating entity to an equipment control system, according to an embodiment of the present invention.

FIG. 5 is a flow chart of an exemplary method 200 for adding an operating entity, such as, for example, a secondary server or an unprotected macro, to provide additional functionality in equipment control system 10, according to an embodiment of the present invention. Method 200 may be performed by a primary server and invoked when additional functionality is required of that primary server and/or its corresponding secondary servers in existence at that time. In one embodiment, method 200 may correspond to step 108 of method 100 shown in FIG. 4, and accordingly, can be performed as a sub-routine of method 100.

Method 200 begins at step 202 where it is determined whether any servers, either the primary server or a corresponding secondary server, are active. A server is "active" if it is currently loaded and running; a server is "inactive" if it is not currently loaded and not currently running, but is available to be loaded. If no servers are active, then a server is started at step 204. Method 200 then moves to step 206.

Otherwise, if it is determined at step 202 that at least one server is active, then method 200 moves directly to step 206 where the primary server scans the next active server (i.e., the server that was loaded or started first) for available macro space.

At step 208, the primary server determines whether there is any "space" to support an appropriate macro in the active server that was scanned. That is, the primary server determines if the scanned server has any "slots" available for the addition of a macro that performs the functions which are being requested at the current moment. If there is space in the active server, then at step 210 the primary server adds the appropriate macro for the desired functionality to that server.

At step 212, the primary server determines whether the server to which the macro was just added is now "full" (i.e., all slots for the particular macro have been filled). If the server is not full, then method 200 ends. Otherwise, if the server is now full because of the latest addition of the macro, then at step 214 the primary server updates the status of that server to indicate that such server is full. Specifically, a "Server=FULL" message (as described above) is generated. Method 200 then ends.

Referring again to step 208, if it is determined that no space is available in the next active server, then at step 216 the primary server determines whether there are any other active servers. If there are more active servers, the primary server returns to step 206 where it scans the next active server for available macro space. The primary server may perform steps 206–216 until an appropriate macro has been added to a server with available macro space or until there are no active servers left to be scanned.

If it is determined at step 216 that there are no more active servers, then at step 218 the primary server determines whether the maximum number of servers have been loaded. If the maximum number of servers have not been loaded, the primary server starts another server at step 204.

Otherwise, if it is determined at step 218 that the maximum number of servers have been loaded, then an initial alarm is sent at step 220. At step 222, the primary server waits for the occurrence of a timeout in any active server, the deletion of a macro from any active server, or the deletion of a server. The deletion of a macro from an existing server or the deletion of a server indicates that space is now available for adding the desired macro. A timeout occurs when any macros on any existing server has ceased processing. The primary server determines whether a timeout has occurred at step 224. If a timeout has occurred, the primary server sends another alarm at step 226. After the alarm is sent, method 200 ends.

On the other hand, if it is determined at step 224 that a timeout has not occurred in any server, then at step 228 the primary server determines whether a macro or a server has been deleted. If neither a macro nor a server has been deleted, then the primary server returns to step 222 where it waits for a timeout or the deletion of a macro or server. Otherwise, if it is determined at step 228 that a macro or a server has been deleted, then method 200 returns to step 202 where the primary server determines whether there are any active servers.

Figure 6:
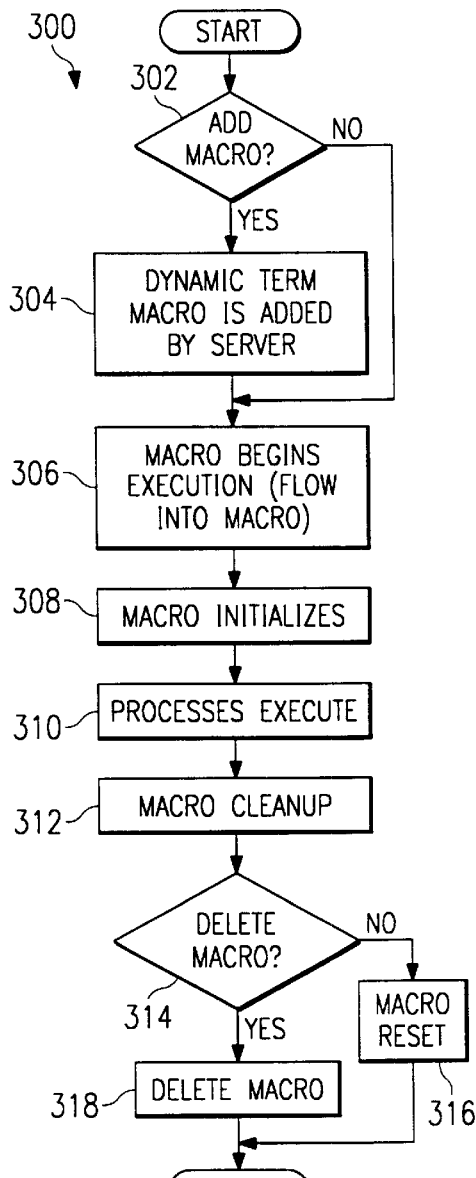
FIG. 6 is a flow chart of an exemplary method for executing a dynamic termination macro, according to an embodiment of the present invention.

FIG. 6 is a flow chart of an exemplary method 300 for executing a dynamic termination macro, according to an embodiment of the present invention. As described above, a dynamic termination macro is a protected or unprotected macro which terminates automatically after it has run. Method 300 may be performed for each dynamic termination macro when its functionality is required.

Method 300 begins at step 302 where a primary server determines whether such a dynamic termination macro should be added or if the macro already exists. If the macro should be added, the primary server adds the dynamic termination macro at step 304, after which method 300 moves to step 306. If the macro already exists, then method 300 proceeds directly to step 306.

At step 306, the dynamic termination macro begins execution—i.e., the macro is run. The dynamic termination macro initializes at step 308. Processes for the dynamic termination macro are executed at step 310. Essentially, this step comprises the performance of the function for which the dynamic termination macro is designed or provided. After the processes have executed, the dynamic termination macro terminates automatically. A clean-up for the dynamic termination macro is performed at step 312.

At step 314, the primary server determines whether the dynamic termination macro should be deleted. If the macro should not be deleted, then the dynamic termination type macro is reset at step 316, after which method 300 ends. Otherwise, if the dynamic termination macro should be deleted, then at step 318 this macro is deleted, thereby causing the software code 15 supporting such macro to be removed from memory 16. Method 300 then ends.

Figure 7:
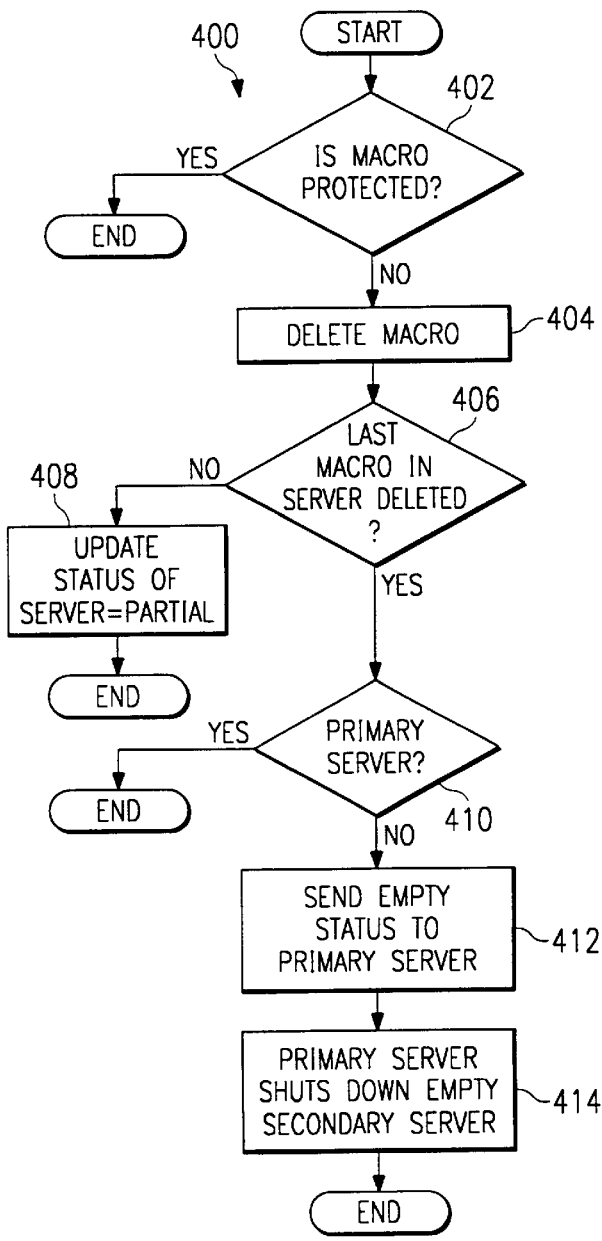
FIG. 7 is a flow chart of an exemplary method for deleting a dynamic termination macro, according to an embodiment of the present invention.

FIG. 7 is a flow chart of a method 400 for deleting a dynamic termination macro, according to an embodiment of the present invention. Method 400 may be performed by a primary server upon a dynamic termination macro residing within that primary server or a corresponding secondary server.

Method 400 begins at step 402, where the primary server determines whether the dynamic termination macro is protected. If the macro is protected, it should not be deleted, and, accordingly, method 400 ends. Otherwise, if the dynamic termination macro is not protected, then at step 404 the primary server deletes the macro from the server within which the macro resides. This causes the software code 15 supporting such macro to be removed from memory 16.

At step 406, the primary server determines whether the dynamic termination macro that was deleted was the last macro within its server. If the deleted dynamic termination macro was not the last macro in such server, then at step 408 the primary server updates the status of the server as being partially full by generating a "Server=PARTIAL" message, after which method 400 ends. Otherwise, if the deleted dynamic termination macro was the last macro in its server, then the primary server determines at step 410 whether such server is the primary server. If the server within which the dynamic termination macro previously resided is a primary server, then such server should not be deleted, and, accordingly, method 400 ends.

On the other hand, if the server within which the deleted macro previously resided is not a primary server, then, by default, such server is a secondary server. A "Server=EMPTY" message is generated and sent to the primary server at step 412. This "Server=EMPTY" message alerts the primary server that the secondary server is now empty, and, accordingly, ready to be shutdown. At step 414, the primary server shuts down the empty secondary server, after which method 400 ends.

Figure 8:
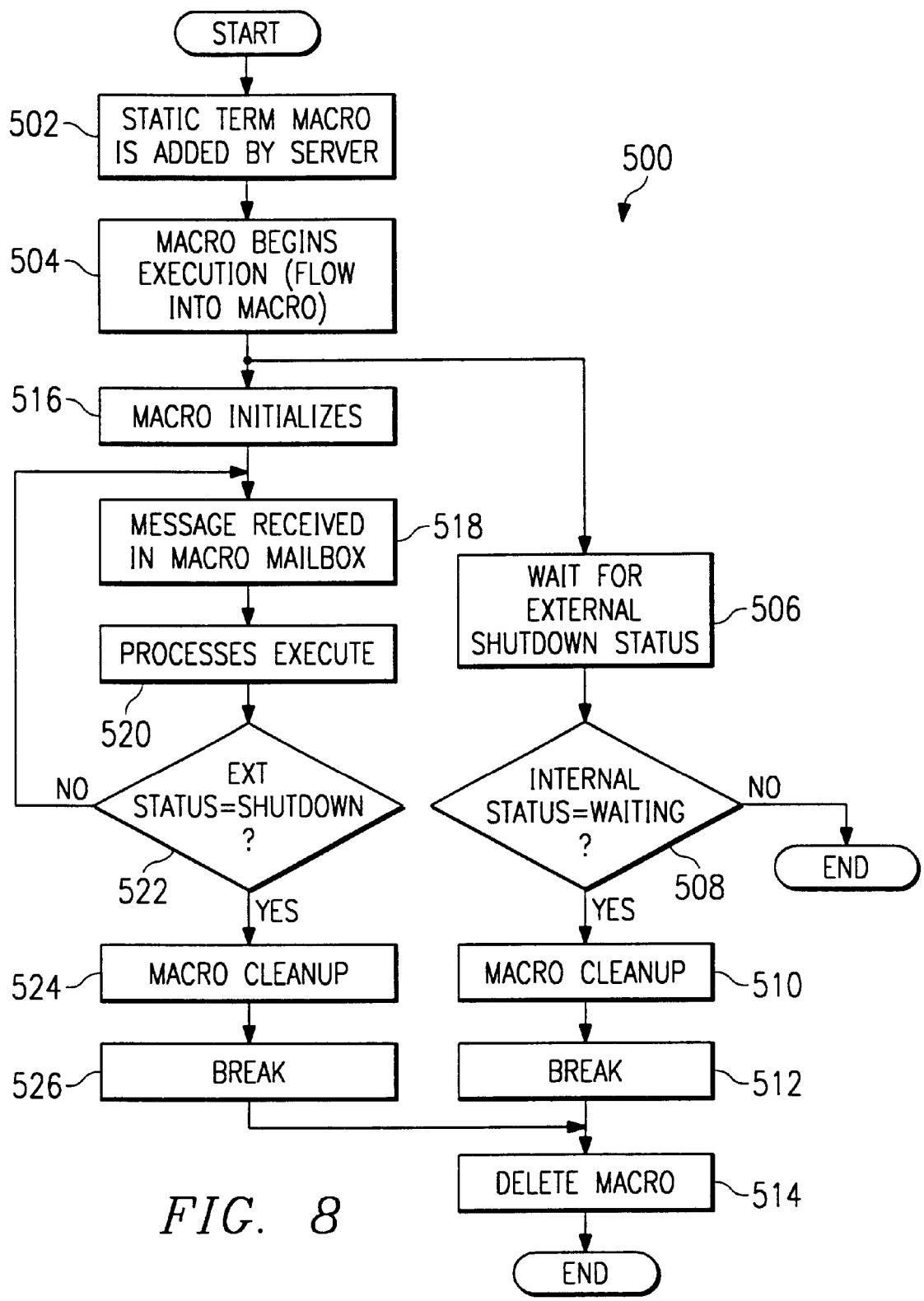
FIG. 8 is a flow chart of an exemplary method for executing a static termination macro, according to an embodiment of the present invention.

FIG. 8 is a flow chart of a method 500 for executing a static termination macro, according to an embodiment of the present invention. A static termination macro is a protected or unprotected macro which runs continuously until it is specifically instructed to terminate. Method 500 may be performed for each static termination macro.

Method 500 begins at step 502 where the static termination macro is added to either a primary server or a secondary server. At step 504, the static termination macro begins to execute or run. At this point, method 500 diverges into two parallel flows of processing.

In the first flow, the static termination macro initializes at step 516. At step 518, a message can be received in a mailbox associated with the static termination macro. In response to the message, processes for the static termination macro are executed at step 520. In other words, the static termination macro performs the functionality for which it was designed or provided. At step 522, the static termination macro determines whether its external status equals shutdown (i.e., the macro has been specifically instructed to shutdown by the server). If the external status of the macro does not equal shutdown, the macro returns to step 518 where it waits to receive a message in its associated mailbox. However, if at step 522 it is determined that the external status of the macro equals shutdown, a macro clean-up is performed at step 524. At step 526, there is a break in the execution of the static termination macro. Method 500 then moves to step 514 where the static termination macro is deleted, after which method 500 ends.

In the second flow of processing, which occurs simultaneous with the performance of steps 516–526 in the first flow of processing, the static termination macro waits for the receipt of a shutdown instruction at step 506. When a shutdown instruction is received, then at step 508 the static termination macro determines whether or not it is currently processing. If the static termination macro is not currently processing, then its internal status is waiting ("Int Status=WAITING"). However, if the macro is currently processing, its internal status is not waiting, thus indicating that the macro is probably running at step 520 in the first flow of processing. Accordingly, the macro cannot be deleted at this time, and method 500 will end; this allows the macro to finish processing without aborting any processes that are running. When the internal status equals waiting, a macro clean-up is performed at step 510. At step 512, there is a break in the execution of the static termination macro. At step 514, the static termination macro is deleted, thereby causing the software code 15 supporting such macro to be removed from memory 16. Method 500 then ends.

From the above description, it should be clear that the static termination macro will only be deleted when it is not currently executing processes and it has received a specific instruction to shutdown.

Figure 9:
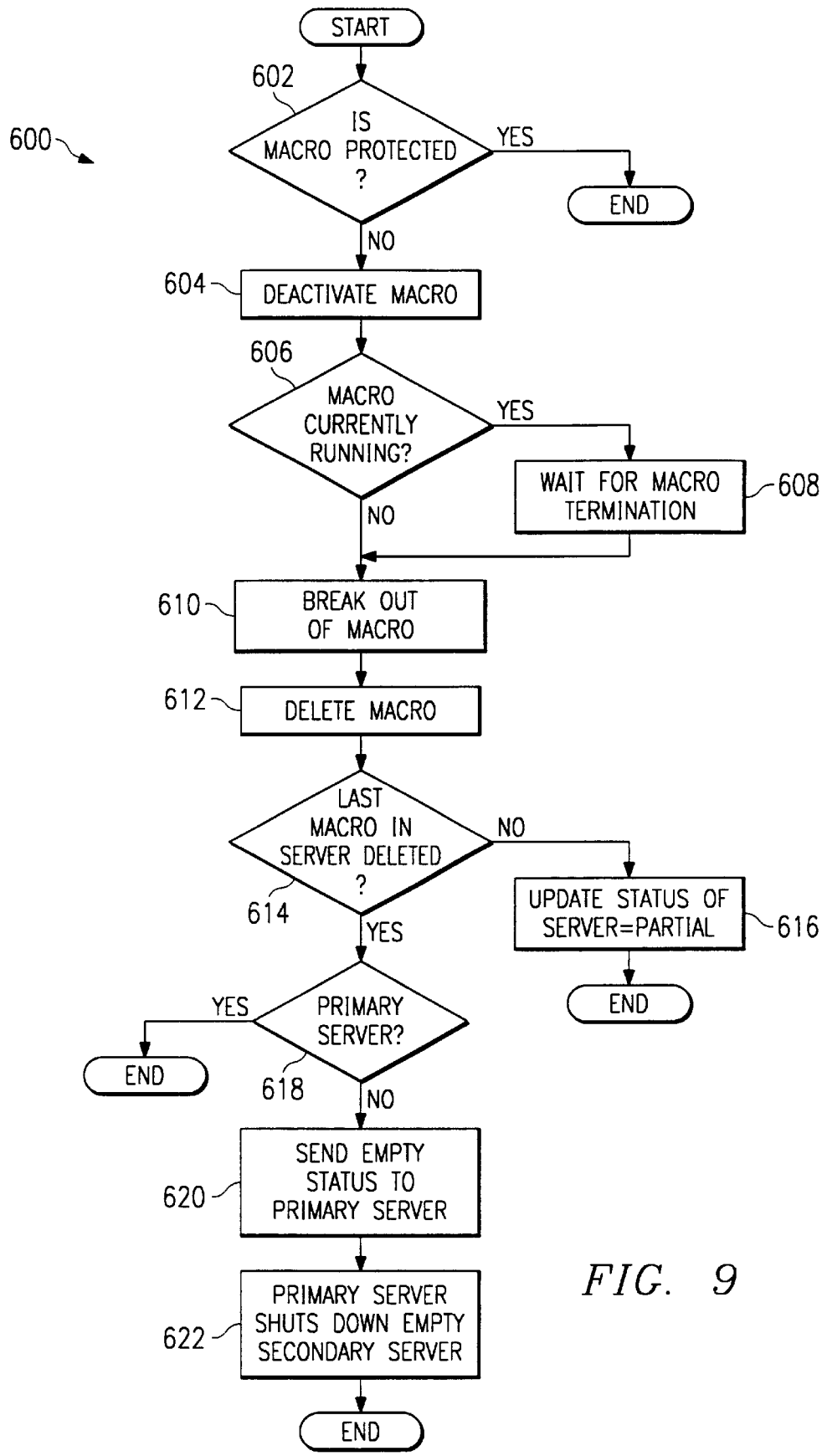
FIG. 9 is a flow chart of an exemplary method for deleting a static termination macro, according to an embodiment of the present invention.

FIG. 9 is a flow chart of a method 600 for deleting a static termination macro according to an embodiment of the present invention. Method 600 may be performed by a primary server operating upon a static termination macro which is contained within that primary server or a corresponding secondary server.

Method 600 begins at step 602, where the primary server determines whether the static termination macro is protected. If the static termination type macro is protected, it should not be deleted, and, accordingly, method 600 ends. Otherwise, if the macro is not protected, the primary server deactivates the static termination macro at step 604.

At step 606, the primary server determines whether the static termination macro is currently running or executing processes. If the macro is currently running, then at step 608 the primary server waits for the static termination macro to terminate, after which the primary server moves to step 610. Otherwise, if the static termination macro is not currently running, then method 600 moves directly to step 610. At step 610 the primary server breaks out of the static termination macro and, at step 612 the primary server deletes the static termination macro. The deletion of the static termination macro causes the software code 15 supporting such macro to be removed from memory 16.

At step 614, the primary server determines whether the static termination macro that was deleted was the last macro within the server previously containing that macro. If the deleted macro was not the last in the server, then at step 616 the primary server updates the status of such server as being partially full ("Server=Partial"), after which method 600 ends.

Otherwise, if the macro that was deleted was the last within its server, then at step 618 the primary server determines whether such server is a primary server. If the server previously containing the static termination macro is a primary server, method 600 ends. Otherwise, if the server previously containing the static termination macro is not a primary server, a "Server=EMPTY" message is sent to the primary server at step 620. This informs the primary server that such server is not currently performing any functions, and, accordingly, is ready to be shutdown. At step 622, the primary server shuts down the empty secondary server, after which method 600 ends.

Although the present invention and its advantages have been described in detail, it should be understood that various changes, substitutions, and alterations can be made therein without departing from the spirit and scope of the invention as defined by the appended claims.

What is claimed is:

1. An equipment control system comprising:
   a computer readable storage medium; and
   a primary server resident on the computer readable storage medium, the primary server associated with at least one device, and operable to:
   monitor the workload of the primary server,
   initiate at least one secondary server operable to perform at least a subset of the functionality provided by the primary server when the workload of the primary server exceeds a first threshold,
   activate a first macro that may not be deleted whenever the primary server is running,
   activate a second macro that may be deleted when the second macro is required, and
   deactivate the second macro when the second macro is no longer required.

2. The equipment control system of claim 1, wherein the primary server is further operable to shut down the secondary server when the workload of the primary server drops below a second threshold.

3. The equipment control system of claim 1, further comprising a plurality of additional primary servers, each associated with at least one device, and each of the plurality of additional primary servers operable to:
   monitor its workload,
   initiate at least one secondary server operable to perform at least a subset of the functionality provided by the primary server when its workload exceeds a first threshold, and
   serve a plurality of additional devices.

4. The equipment control system of claim 1, further comprising a plurality of additional secondary servers operable to perform at least a subset of the functionality provided by the primary server when its workload exceeds a first threshold.

5. The equipment of control system of claim 1, wherein the workload of the primary server exceeds the first threshold when a predetermined number of messages are waiting to be processed.

6. The equipment control system of claim 1, wherein the workload of the primary server exceeds the first threshold when the primary server process is unavailable for processing.

7. The equipment control system of claim 1, wherein the workload of the primary server drops below a second threshold when the primary server process is not waiting on the secondary server to complete performing.

8. The equipment control system of claim 1, wherein the workload of the primary server drops below a second threshold when the secondary server has completed performing.

9. The equipment control system of claim 1, wherein the second macro is required when the primary server requires processing in addition to the functionality provided by the first macro.

10. The equipment control system of claim 1, wherein the primary server is further operable to activate the second macro on the secondary server when the workload of the primary server exceeds the first threshold.

11. The equipment control system of claim 1, wherein the primary server is further operable to deactivate the second macro by terminating processing of the second macro, and to delete the second macro.

12. The equipment control system of claim 1, wherein the primary server is further operable to shut down the secondary server after deleting the second macro.

13. A method for optimizing the operation of an equipment control system, comprising:
   activating a primary server resident on a computer readable storage medium, the primary server associated with at least one device;
   monitoring the workload of the primary server;
   initiating at least one secondary server operable to perform at least a subset of the functionality provided by the primary server when the workload of the primary server exceeds a first threshold;
   activating, using the primary server, a first macro that may not be deleted whenever the primary server is running;
   activating, using the primary server, a second macro that may be deleted, the second macro operable to perform at least a subset of the functionality provided by the first macro when the second macro is required; and
   deactivating the second macro using the primary server when the second macro is no longer required.

14. A method of claim 13, wherein activating a primary server comprises loading the primary server into memory and starting its execution.

15. A method of claim 13, further comprising shutting down the secondary server when the workload of the primary server drops below a second threshold.

16. A method of claim 13, further comprising activating the second macro on the secondary server when the workload of the primary server exceeds the first threshold.

* * * * *